(12) United States Patent
Moutz, Jr.

(10) Patent No.: US 11,679,963 B1
(45) Date of Patent: Jun. 20, 2023

(54) PORTABLE VEHICLE HARDTOP REMOVAL APPARATUS

(71) Applicant: Michael B Moutz, Jr., Seabrook, TX (US)

(72) Inventor: Michael B Moutz, Jr., Seabrook, TX (US)

( * ) Notice: Subject to any disclaimer, the term of this patent is extended or adjusted under 35 U.S.C. 154(b) by 22 days.

(21) Appl. No.: 17/581,622

(22) Filed: Jan. 21, 2022

(51) Int. Cl.
  *B66C 23/44* (2006.01)
  *B60J 7/10* (2006.01)

(52) U.S. Cl.
  CPC .............. *B66C 23/44* (2013.01); *B60J 7/106* (2013.01)

(58) Field of Classification Search
  CPC ........ B66C 23/44; B60P 1/548; B60P 1/5471; B60P 1/5476; B60P 1/5485; B60P 1/549; B60P 1/5495
  See application file for complete search history.

(56) References Cited

U.S. PATENT DOCUMENTS

| | | | |
|---|---|---|---|
| 4,881,864 A | 11/1989 | Amato | |
| 5,520,498 A * | 5/1996 | DiBartolomeo | B66C 23/44 414/550 |
| 5,540,537 A | 7/1996 | Welch | |
| 5,749,697 A * | 5/1998 | Davis | B66F 9/061 212/253 |
| 5,752,799 A * | 5/1998 | Carey | B60P 1/5471 224/403 |
| 5,788,095 A * | 8/1998 | Watson | B66C 23/44 212/253 |
| 5,971,177 A * | 10/1999 | Carter | B66C 23/44 212/177 |
| 6,152,675 A * | 11/2000 | Compton | B60P 1/5495 224/403 |
| 6,202,868 B1 * | 3/2001 | Murray | B66C 23/44 452/187 |
| 6,981,834 B1 | 1/2006 | Henry | |
| 7,419,347 B1 | 9/2008 | Cormier | |
| 7,604,450 B1 * | 10/2009 | Calvery | B66C 23/44 212/270 |
| 8,511,646 B1 * | 8/2013 | Woodard | B66C 23/485 254/338 |

(Continued)

*Primary Examiner* — Michael R Mansen
*Assistant Examiner* — Juan J Campos, Jr.
(74) *Attorney, Agent, or Firm* — Norton IP Law Firm LLC; Taylor M. Norton

(57) ABSTRACT

The present disclosure provides for a portable vehicle hardtop removal apparatus for improved vehicle hardtop removal and replacement features in order to efficiently remove and replace hardtops of many types of vehicles, in a safe and convenient manner, for people's enjoyment. The portable vehicle hardtop removal apparatus comprises a upstanding support member removably connected to an upstanding swivel member that is fixed to the horizontal support arm. A lift boom extends from the upstanding support member, and a hoist line extends along the upstanding support member and the lift boom. An elongated spreader tube is connected to a distal end of the hoist line, and a plurality of straps removably connect the elongated spreader tube to a vehicle hardtop for its removal. The lift boom is positionable from a lifting position to a collapsed or folded transport position for efficient transportation of the portable vehicle hardtop removal apparatus to any destination.

6 Claims, 7 Drawing Sheets

(56) References Cited

U.S. PATENT DOCUMENTS

| | | | | |
|---|---|---|---|---|
| 2003/0000906 A1* | 1/2003 | Perkins | ............... | B66C 23/44 |
| | | | | 212/180 |
| 2003/0007855 A1 | 1/2003 | van der Horn | | |
| 2004/0040925 A1* | 3/2004 | Miller | ............... | B66C 23/44 |
| | | | | 212/180 |
| 2010/0295005 A1* | 11/2010 | Riggs | ............... | B66C 23/44 |
| | | | | 254/326 |
| 2012/0294700 A1* | 11/2012 | Ervin | ............... | B66F 7/28 |
| | | | | 254/46 |
| 2013/0280020 A1* | 10/2013 | O'Brien | ............... | B66C 23/36 |
| | | | | 414/543 |
| 2020/0062563 A1* | 2/2020 | Roland | ............... | B66C 23/44 |

* cited by examiner

PORTABLE VEHICLE HARDTOP REMOVAL APPARATUS

BACKGROUND OF THE INVENTION

Field of the Invention

The present invention generally relates to vehicle top removal devices and more particularly relates to a portable vehicle hardtop removal device.

Description of the Related Art

Convertibles vehicles bearing hardtops and soft tops have long been commonplace in the vehicle industry in light of their classy sporty style, better visibility, and established versatility. There are various vehicles that have been manufactured such that a portion of the roof or top canopy and sidewall of the vehicle is removable. Most prevalent would be the various JEEP® model sport utility vehicles that are common on roadways today. Additionally, hard tops or camper shells are commonly used on pick-up trucks with beds and present the same challenges of removal and installation by a single person. Vehicle owners travel to various destinations for recreation and they desire to drive their vehicle with the top removed to enjoy the breeze and weather. Further, a vehicle owner may need their rear compartment open and not covered.

With a growing population of vehicles bearing removable hardtops, many vehicle owners are tasked with lifting and removing the hardtops from their respective vehicles in order to achieve the open-air driving experience. A hoist assembly for lifting a hardtop on and off of a vehicle, such as a Jeep® model sport utility vehicle, often is required since the hardtop may not be lifted easily by hand.

Over the years, various devices have been made to assist people with the removal of hardtops from vehicles in attempts to alleviate the otherwise heavy burden of doing so by hand alone.

For instance, U.S. Pat. No. 10,822,010 to Brown, issued Nov. 3, 2020, provides a vehicle hardtop assistance device having a freestanding frame which is moved in a horizontal direction by wheels affixed to the freestanding frame. Although this device may be connected to the back of a vehicle for stability, the device is not structurally fit to be transported in the manner of a trailer, and thus, it does not achieve ease of portability and convenience. Instead, multiple devices are necessary in order for an owner to remove or replace the hardtop at different destinations. The mobility of such large heavy free-standing frames is limited as they are difficult to maneuver.

U.S. Pat. No. 7,607,546 to Hopper, issued Oct. 27, 2009, provides a hoist assembly which can mate with a vehicle receiver hitch, where the assembly includes a base member supported by two vertically adjustable legs that stand upright supported by the ground. However, the device of Hopper requires engagement of the ground and also requires a ram that impedes the ability to swing freely over a hardtop of the vehicle. The mobility of such large heavy standing frame legs is also limited as it is difficult to maneuver. Thus, it would be desirable to provide a hoist assembly which provides for lifting, removing and replacing vehicle hardtops without modification to the vehicle itself or requiring additional supports or devices to increase the lift capability. Further, it would be desirable to provide a hoist assembly that may be readily leveled horizontally and adjusted to a vertical position at the option and convenience of the owner.

More recently, U.S. Patent Publication No. 2020/0062563 by Roland, published Feb. 27, 2020, discloses a vehicle hard top lift device comprising a receiver bar with a pivot post on its upper surface opposite a receiver. Such device includes a upper frame portion that is flat and purposed for lifting up in flush contact the interior roof of a vehicle hard top; but the device requires tipping of the front end of the hardtop higher and more quickly than the back end of the hardtop, which requires additional headspace above the hardtop in order to remove from the vehicle, and that can cause tipping, droppage and/or breakage of a vehicle hardtop, creating unsafe conditions. Such devices are inconvenient in use.

Such commonly known devices are of complex construction, largely inefficient in operation, and limited to a fixed geographical location. Rather than having separate hoist assemblies to lift, remove, and position a hardtop on and off a vehicle at its destination or at multiple destinations, it would be more efficient and convenient to have a hoist assembly which may be mounted to the vehicle, and which may travel with the vehicle.

While these conventional units may be suitable for the particular purpose employed, they would not be as suitable for the purposes of the present invention as disclosed hereafter.

There is a need for a portable, hand-operated device for vehicle owners to remove and replace hardtops from their vehicles easily and efficiently.

Accordingly, there is a need for a compact portable lightweight vehicle hardtop removal device for attending to the removal and replacement of hardtops in a more convenient, effective, and portable manner.

One object of the embodiments of the disclosed invention is to provide a portable vehicle hardtop removal apparatus that allows easy, efficient, and safe installation and removal of a hardtop in various destinations and locations.

Another object of the disclosed invention is to provide for a hardtop lift device that more quickly allows the vehicle hardtop to clear any roll bar that is in the rear compartment of the vehicle by allowing the hardtop to be lifted, rotated, and placed safely on the ground, by a single person.

Yet another object is to provide for a hardtop removal device that provides a stable lifting solution that is not subject to failure.

As disclosed in this application, the inventor has discovered novel and unique devices and methods for portable and efficient removals and replacements of hardtops, which exhibit superlative properties without being dependent on heavy, immobile, expensive or complex components.

Embodiments of the present invention provide for devices and methods disclosed herein and as defined in the annexed claims which provide for improved vehicle hardtop removal and replacement features in order to efficiently remove and replace hardtops of many types of vehicles, in a safe and convenient manner, for people's enjoyment.

SUMMARY OF THE INVENTION

It is one prospect of the present invention to provide one or more novel devices of simple but effective construction which can be applied to many vehicles to portably, efficiently, and effectively remove and replace hardtops of vehicles at multiple destinations.

The following presents a simplified summary of the present disclosure in a simplified form as a prelude to the more detailed description that is presented herein.

Therefore, in accordance with embodiments of the invention, there is provided a portable vehicle hardtop removal apparatus having a horizontal support arm having a first end opposite a second end. The first end of the horizontal support arm is adapted to removably extend into a conventional tow receiver hitch mounted on a vehicle. The second end of the horizontal support arm protrudes outward from the vehicle's receiver hitch, and the second end includes an upstanding swivel member.

The portable vehicle hardtop removal apparatus includes an upstanding support member having an upper portion opposite a bottom portion. Preferably, the upper portion is telescopically received in the bottom portion. The bottom portion define a cylindrical hollow cavity within which the upstanding swivel member is operatively seated, such that the upstanding support member can rotate relative to the horizontal support arm.

In a preferred embodiment, the upper portion and the bottom portion of the upstanding support member each have respective sidewalls which define a plurality of linearly aligned support adjustment apertures adapted for receipt of a support locking pin, for adjustment of a height of the upper portion relative to the bottom portion, for adjustment of a height of the upstanding support member relative to the ground, at an option of a user.

In one embodiment, the bottom portion of the upstanding support member has a bottommost end which defines the cylindrical hollow cavity within which the upstanding swivel member is operatively and adjustably seated.

The upper portion of the upstanding support member has an upper end having a load bearing support end surface formed on a load bearing angle. The load bearing angle departs from a horizontal plane that is perpendicular to a longitudinal axis of the upstanding support member.

Preferably, the upper end of the upstanding support member includes a pair of guide tabs fixed to the respective sidewalls of the upper end. The pair of guide tabs are oriented perpendicular to the load bearing support end surface. Further, the upper end of the upstanding support member has a pivot pin connection.

The portable vehicle hardtop removal apparatus includes a lift boom having a proximal end opposite a distal end. The proximal end of the lift boom has a load bearing boom end surface formed on a load bearing angle. Such load bearing angle departs from a horizontal plane that is perpendicular to a longitudinal axis of the lift boom. The proximal end of the lift boom is pivotally coupled to (and extends away from) the pivot pin connection of the upper end of the upstanding support member. As such, the lift boom is pivotable from a lifting position to a folded transport position, which is compact, and the folded transport position facilitates ease of portability of the portable vehicle hardtop removal apparatus, as the portable vehicle hardtop removal apparatus is connected to the receiver hitch of the vehicle.

In the lifting position, the proximal end of the lift boom fits between the pair of guide tabs, which are adapted to resist a lateral movement of the lift boom, and the load bearing boom end surface of the lift boom bears on the load bearing support end surface of the upstanding support member. While in the lifting position, the lift boom extends upward at an angle that departs from a vertical plane that is parallel to a longitudinal axis of the upstanding support member.

In one embodiment, in the folded transport position, the lift boom hangs from the pivot pin connection and is oriented in parallel to the upstanding support member. The portable vehicle hardtop removal apparatus is easily transportable in such compact manner.

The portable vehicle hardtop removal apparatus includes a winch removably attached to the upstanding support member. Preferably, the winch is removably fixed to the upper portion of the upstanding support member. In another embodiment, the winch is removably fixed to the bottom portion of the upstanding support member.

In a preferred embodiment, the winch includes a hoist line extending vertically from the winch through a first pulley that is operatively connected to the upper portion of the upstanding support member. Preferably, the hoist line extends from the first pulley through a second pulley, and the second pulley is operatively connected to the distal end of the lift boom. In another embodiment, the first pulley is operatively connected to the proximal end of the lift boom.

The portable vehicle hardtop removal apparatus includes an elongated spreader tube connected to a distal end of the hoist line. The elongated spreader tube has a first end opposite a second end. Preferably, the first end and the second end of the elongated spreader tube each respectively define a plurality of linearly aligned support adjustment apertures, each configured to connect to a respective strap, at the option of the user. The plurality of linearly aligned support adjustment apertures allows a user to adjust a spreader width between the straps to meet the needs of the particular size of the hardtop intended to be removed. Straps connect the elongated spreader tube to the removable vehicle hardtop, such that the elongated spreader tube is configured to attach to and lift a removable vehicle hardtop off of the vehicle when said winch is rotated to wind the hoist line thereon.

In a preferred embodiment, the portable vehicle hardtop removal apparatus includes a first strap, a second strap, a third strap and a fourth strap. Preferably, the first and second straps each have a respective connection end operatively connected to one respective spreader aperture of the plurality of linearly aligned spreader apertures of the first end of the elongated spreader tube. The second and third straps each have a respective connection end operatively connected to one respective spreader aperture of the plurality of linearly aligned spreader apertures of the second end of the elongated spreader tube.

Preferably, the second strap and the fourth strap each have a respective flat hook end adapted to penetrate a gap between a rear window and a structural frame of the removable vehicle hardtop.

In a preferred embodiment, the distal end of the lift boom of the portable vehicle hardtop removal apparatus is telescopically received inside the proximal end of the lift boom. The distal end and the proximal end of the lift boom each preferably have respective sidewalls which define a plurality of linearly aligned boom apertures adapted for receipt of a boom locking pin, for adjustment of the height of the distal end relative to the proximal end, configured for adjustment of an extension length of the lift boom, at an option of a user.

In one embodiment, the portable vehicle hardtop removal apparatus includes a support locking pin and a boom locking pin; the support locking pin is removably disposed in one support adjustment aperture of the plurality of linearly aligned support adjustment apertures, and the boom locking pin is removably disposed in one boom aperture of the plurality of linearly aligned boom apertures.

In yet another embodiment, the portable vehicle hardtop removal apparatus includes an electric winch, and the electric winch has a power cord adapted to removably connect to a 12 volt outlet of the vehicle.

These and other features, aspects, and advantages of the present invention will become better understood with reference to the following description and appended claims.

BRIEF DESCRIPTION OF THE DRAWINGS

Illustrative embodiments of the present invention are described herein with reference to the accompanying drawings, in which like numerals throughout the figures identify substantially similar components, in which.

DETAILED DESCRIPTION

For a further understanding of the nature and function of the embodiments, reference should be made to the following detailed description. Detailed descriptions of the embodiments are provided herein, as well as, the best mode of carrying out and employing the present invention. It will be readily appreciated that the embodiments are well adapted to carry out and obtain the ends and features mentioned as well as those inherent herein. It is to be understood, however, that the present invention may be embodied in various forms. Therefore, persons of ordinary skill in the art will realize that the following disclosure is illustrative only and not in any way limiting, as the specific details disclosed herein provide a basis for the claims and a representative basis for teaching to employ the present invention in virtually any appropriately detailed system, structure or manner. It should be understood that the devices, materials, methods, procedures, and techniques described herein are presently representative of various embodiments. Other embodiments of the disclosure will readily suggest themselves to such skilled persons having the benefit of this disclosure.

As used herein, "axis" means a real or imaginary straight line about which a three-dimensional body is symmetrical. A "vertical axis" means an axis perpendicular to the ground (or put another way, an axis extending upwardly and downwardly). A "horizontal axis" means an axis parallel to the ground.

Figure 1:
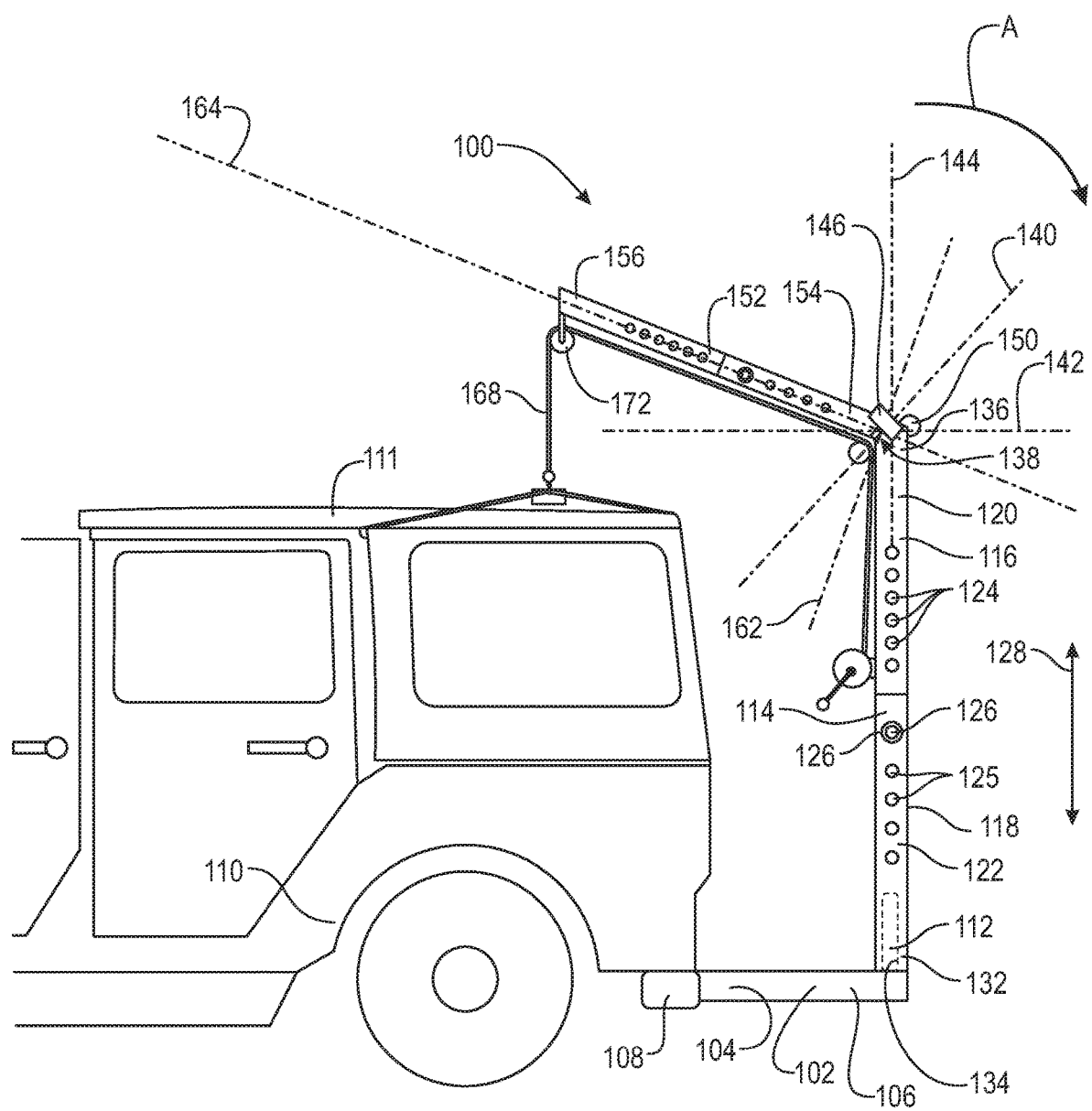
FIG. 1 is a right side elevation view of a portable vehicle hardtop removal apparatus in a lifting position removably connected to a receiver hitch of an exemplary vehicle, in accordance with embodiments of the invention.
Figure 2:
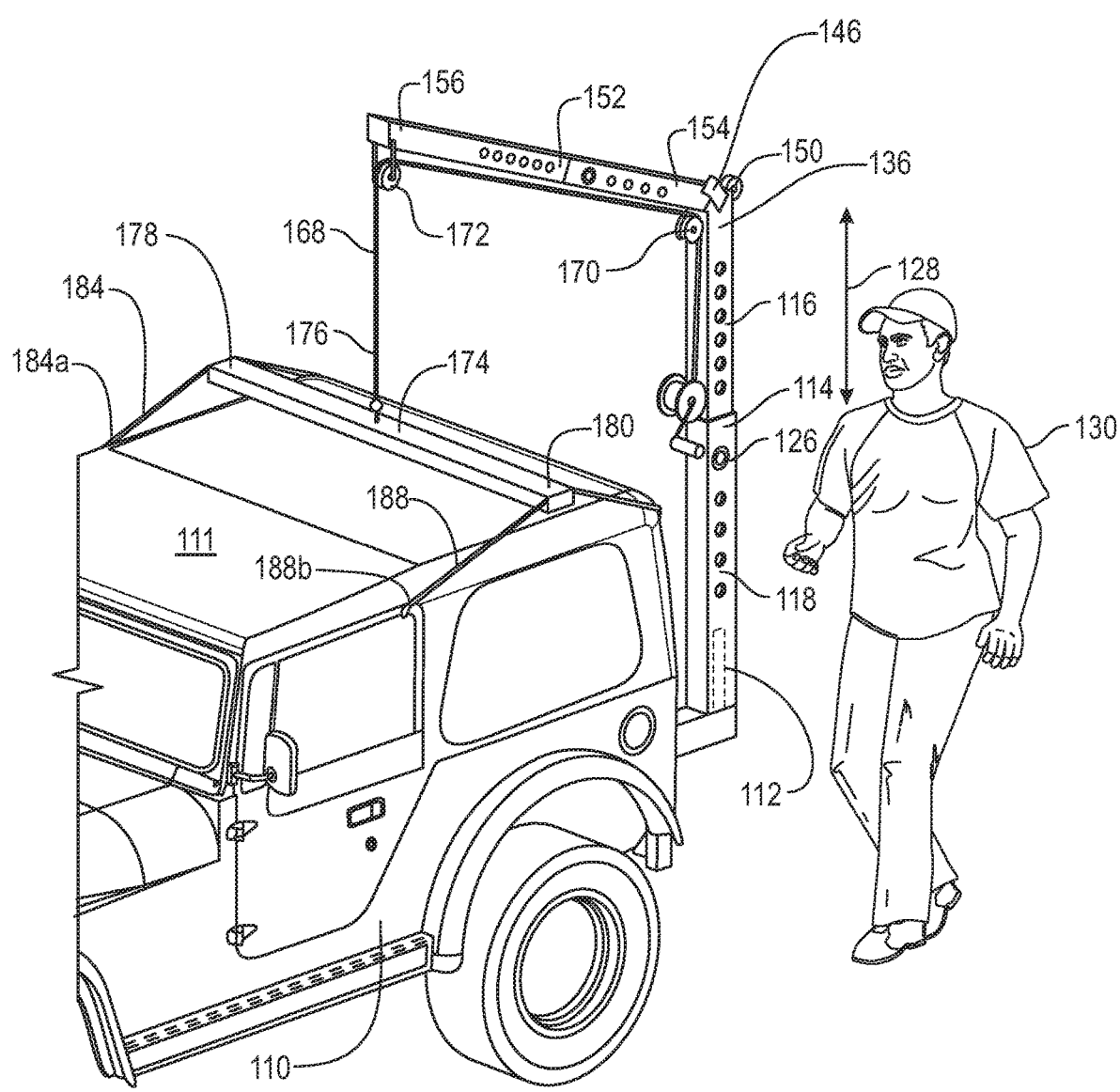
FIG. 2 is a front right perspective view of a portable vehicle hardtop removal apparatus in a lifting position removably connected to an exemplary receiver hitch of a vehicle, in accordance with embodiments of the invention.

Referring initially to FIGS. 1-2, the basic constructional details and principles of operation of embodiments of a portable vehicle hardtop removal apparatus 100 according to preferred embodiments of the present invention will be discussed.

In FIG. 1, a portable vehicle hardtop removal apparatus 100 according to preferred embodiments of the present invention is provided. As illustrated in FIG. 1, the portable vehicle hardtop removal apparatus 100 has a horizontal support arm 102 having a first end 104 opposite a second end 106. The first end 104 of the horizontal support arm 102 is adapted to removably extend into a tow receiver hitch 108 mounted on a vehicle 110.

The second end 106 of the horizontal support arm 102 protrudes outward from the vehicle receiver hitch 108, and the second end includes an upstanding swivel member 112. The subject invention which is described thoroughly herein is readily adaptable for use with various different sizes, shapes, and thicknesses of different vehicle receiver hitches 108.

The portable vehicle hardtop removal apparatus includes an upstanding support member 114 having an upper portion 116 opposite a bottom portion 118. Preferably, the upper portion 116 is telescopically received in the bottom portion 118. In one embodiment, the upper portion 116 and the bottom portion 118 of the upstanding support member 114 is formed as a single unit of a homogenous material.

In a preferred embodiment, the upper portion 116 and bottom portion 118 each have respective sidewalls 120, 122 which define a plurality of linearly aligned support adjustment apertures 124, 125 adapted for receipt of a support locking pin 126, for adjustment of a height 128 of the upper portion 116 relative to the bottom portion 118, for adjustment of a height of the upstanding support member 114 relative to the ground, at an option of a user.

It can appreciated from this disclosure that the horizontal support arm 102 and the upstanding support member 114 are each is preferably fabricated with a homogenous material. As used herein, homogeneous is defined as the same in all locations, and a homogeneous material is a material of uniform composition throughout that cannot be mechanically separated into different materials. Examples of "homogeneous materials" are certain types of plastics, metals, alloys, resins, and high-density polyethylene.

Figure 6:
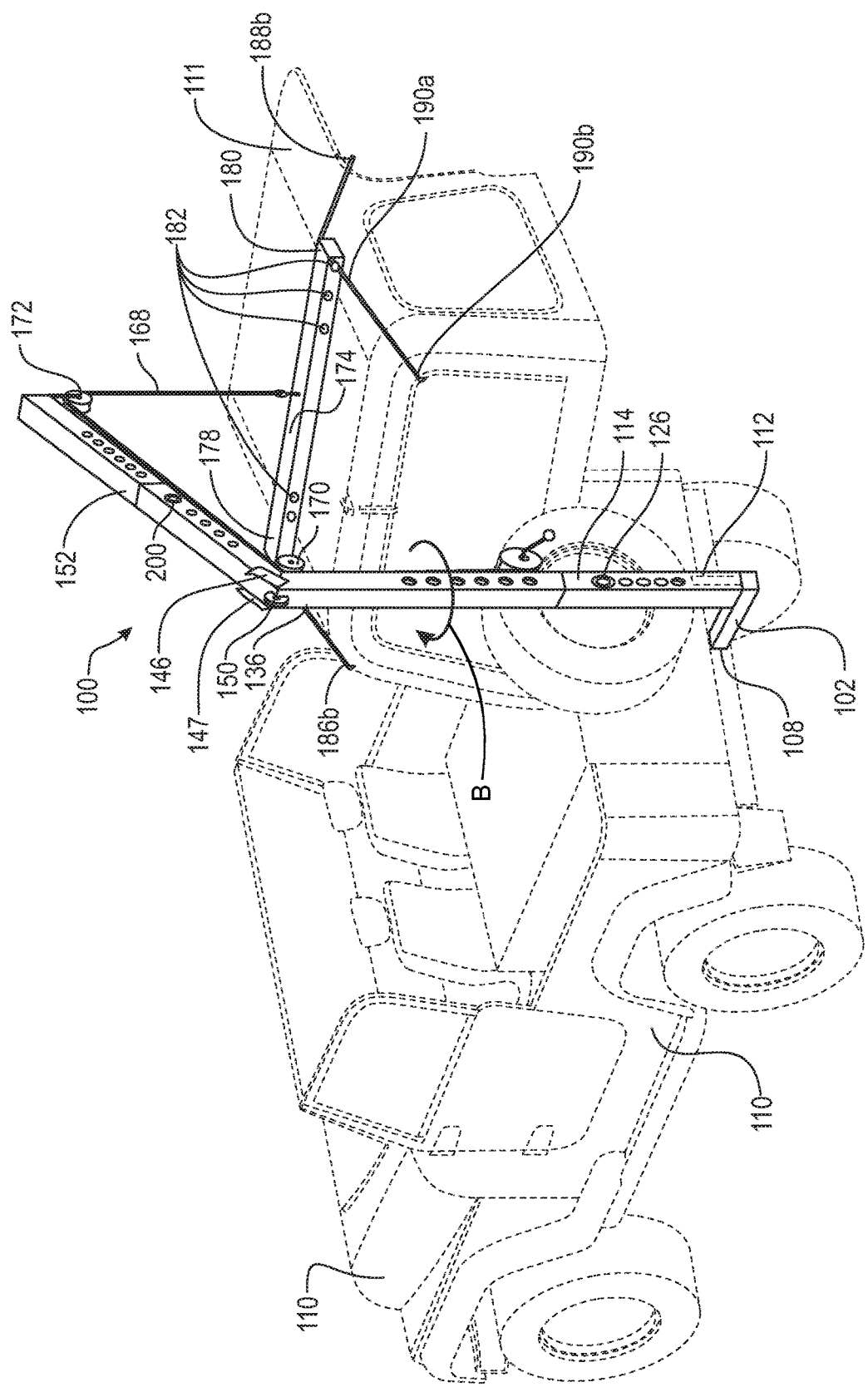
FIG. 6 is a back right perspective view of a portable vehicle hardtop removal apparatus removably connected to an exemplary vehicle hardtop illustrated in a lifted and rotated position, while removably connected to a receiver hitch of an exemplary vehicle, in accordance with embodiments of the invention.

In one embodiment, the bottom portion 118 of the upstanding support member 114 has a bottommost end 132 which defines a cylindrical hollow cavity 134 within which the upstanding swivel member 112 is operatively and adjustably seated. The upstanding support member 114 can swivel relative to the fixed upstanding swivel member 112 such that the portable vehicle hardtop removal apparatus 100 can rotate (for example, in the direction of Arrow B) a vehicle hardtop away from the vehicle as illustrated in FIG. 6.

The upper portion 116 of the upstanding support member 114 has an upper end 136 having a load bearing support end surface 138 formed on a load bearing angle 140. As illustrated in FIG. 1, the load bearing angle 140 departs from a horizontal plane 142 that is perpendicular to a longitudinal axis 144 of the upstanding support member 114.

Preferably, the upper end 136 of the upstanding support member 114 includes a pair of guide tabs 146, 147 fixed to the respective sidewalls 120 of the upper end 136. The pair of guide tabs 146, 147 are oriented perpendicular to the load bearing support end surface 138. Further, the upper end 136 of the upstanding support member 114 has a pivot pin connection 150, disposed on a back side of the upstanding support member 114.

Figure 5:
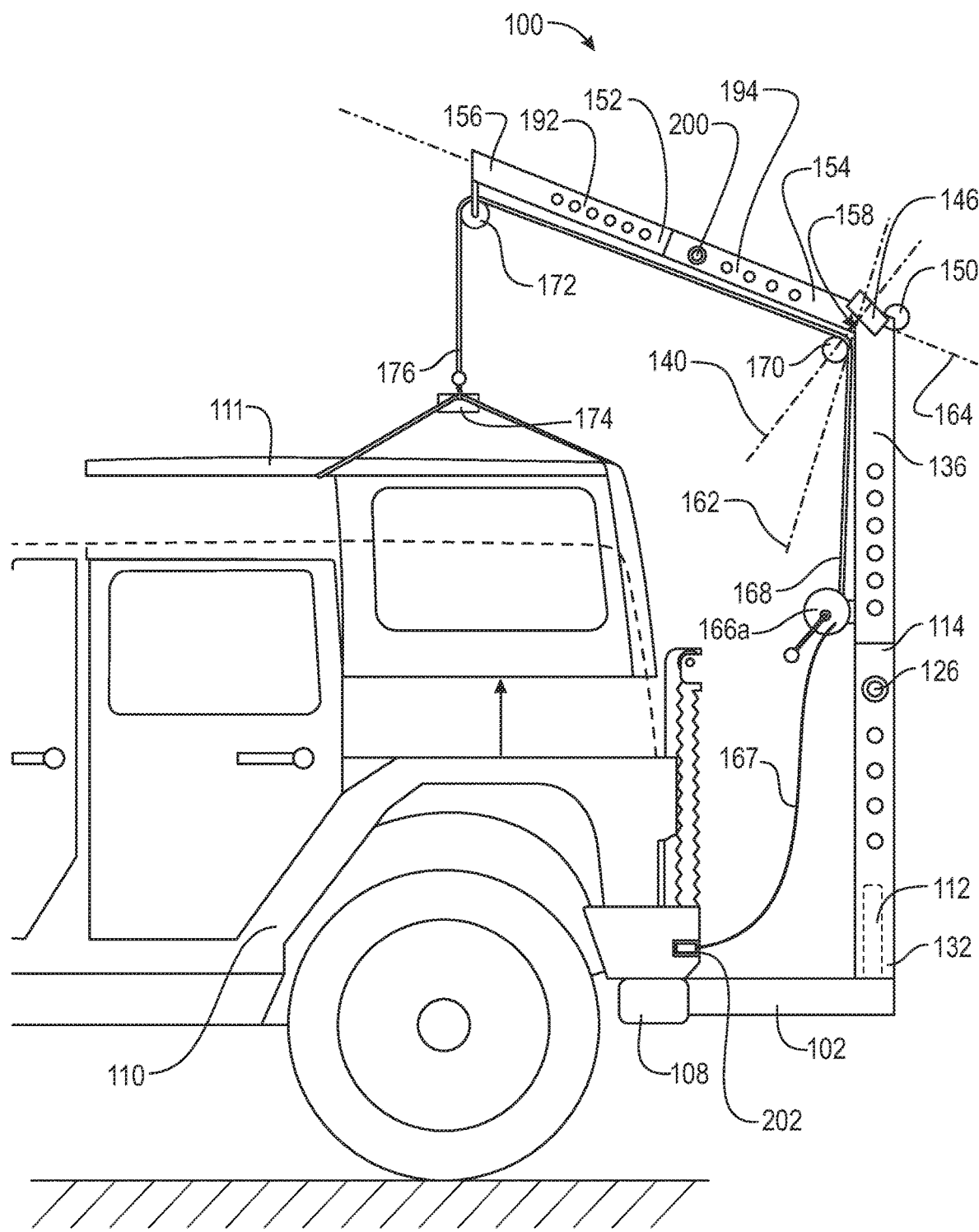
FIG. 5 is a right side elevation view of a portable vehicle hardtop removal apparatus removably connected to an exemplary vehicle hardtop illustrated in a lifted position, while removably connected to a receiver hitch of an exemplary vehicle, in accordance with embodiments of the invention.
Figure 7:
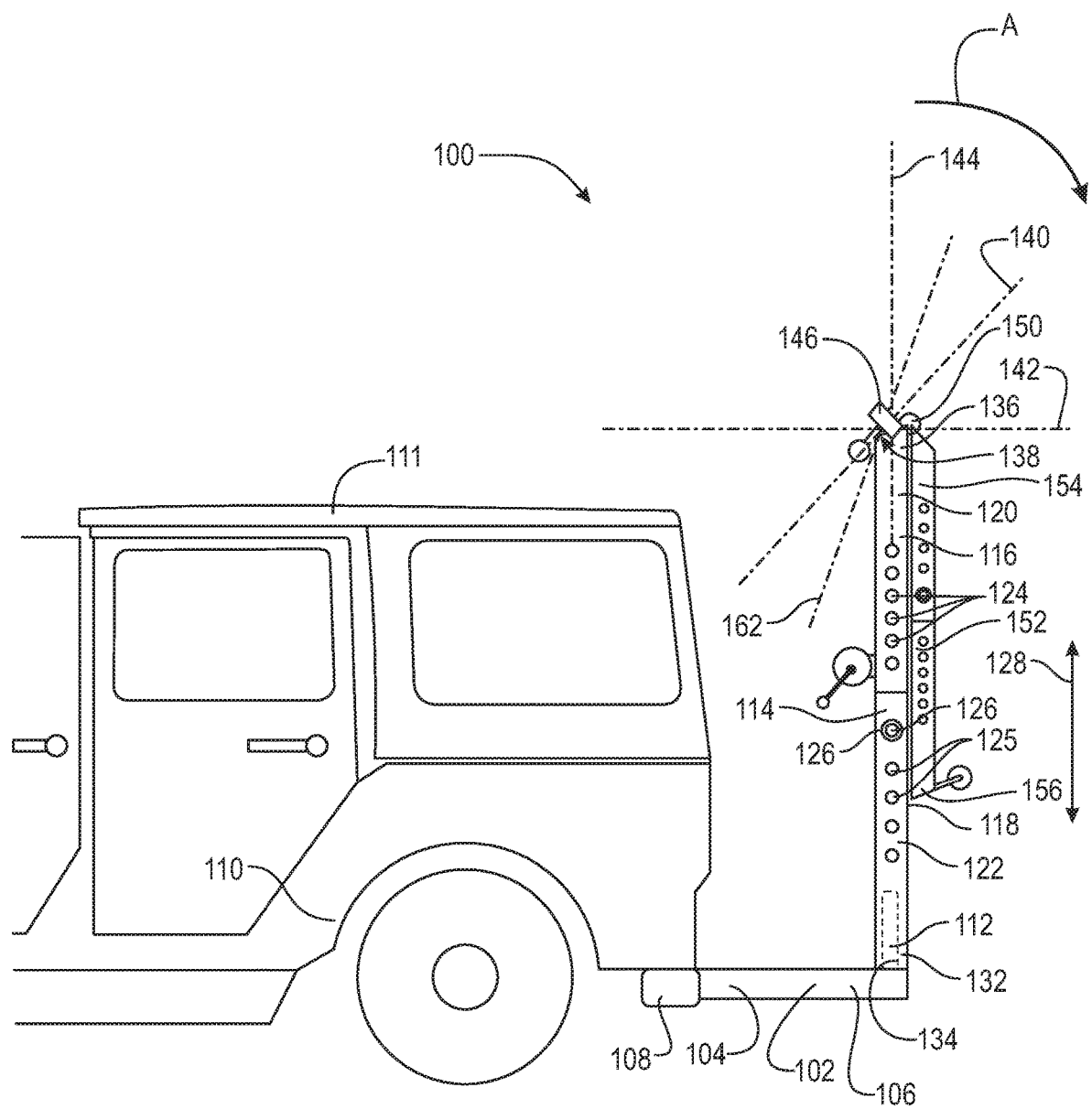
FIG. 7 is a back right perspective view of a portable vehicle hardtop removal apparatus in a folded transport position removably connected to an exemplary vehicle hardtop, while removably connected to a receiver hitch of an exemplary vehicle, in accordance with embodiments of the invention.

Referring to FIGS. 1 and 5, the portable vehicle hardtop removal apparatus 100 includes a lift boom 152 having a proximal end 154 opposite a distal end. The proximal end 154 of the lift boom 152 has a load bearing boom end surface 158 (FIG. 5) formed on a load bearing angle 160. Such load bearing angle 160 departs from a horizontal plane 162 that is perpendicular to a longitudinal axis 164 of the lift boom 152. The proximal end 154 of the lift boom 152 is pivotally coupled to and extending away from the pivot pin connection 150 of the upper end 136 of the upstanding support member 114. As such, when the portable vehicle hardtop removal apparatus 100 is not connected to a vehicle hardtop, the lift boom 152 is pivotable (in the direction of Arrow A in FIG. 1) from a lifting position (as illustrated in FIGS. 1 and 5) to a folded transport position (as illustrated in FIG. 7), and the folded transport position facilitates ease of portability of the portable vehicle hardtop removal apparatus 100. In the folded transport position, the portable vehicle hardtop removal apparatus 100 is attached to the receiver hitch 108 of the vehicle 110, where it can be driven to the intended destination of the owner 130. As can be seen, given the portable nature of the portable vehicle hardtop removal apparatus 100, embodiments of the invention disclosed herein obviate the need to have multiple lifting hoist devices at various destinations.

In the lifting position, the proximal end 154 of the lift boom 152 fits between the pair of guide tabs 146, 147, which are adapted to resist a lateral movement of the lift boom 154, and the load bearing boom end surface 158 of the lift boom 152 bears on the load bearing support end surface 138 of the upstanding support member 114. While in the lifting position, the lift boom 152 extends upward at an angle 164 that departs from a vertical plane that is parallel to a longitudinal axis 144 of the upstanding support member 114.

In one embodiment, in the folded transport position, the lift boom 152 hangs from the pivot pin connection 150 and is oriented in parallel to the upstanding support member 114, as illustrated in FIG. 7. The portable vehicle hardtop removal apparatus 100 is easily transportable in such manner.

The portable vehicle hardtop removal apparatus 100 includes a winch 166 removably attached to the upstanding support member 114. Preferably, the winch 166 is removably fixed to the upper portion 116 of the upstanding support member 114, as illustrated in FIGS. 1-7. In another embodiment, the winch 166 is removably fixed to the bottom portion 118 of the upstanding support member 114.

Referring to FIG. 2, in a preferred embodiment, the winch 166 includes a hoist line 168 extending vertically from the winch 166 through a first pulley that is operatively connected to the upper portion 116 of the upstanding support member 114. In a preferred embodiment, the hoist line extends from the first pulley 170 through a second pulley 172, and the second pulley 172 is operatively connected to the distal end 156 of the lift boom 152. In another embodiment, the first pulley 170 is operatively connected to the proximal end of the lift boom.

Figure 3:
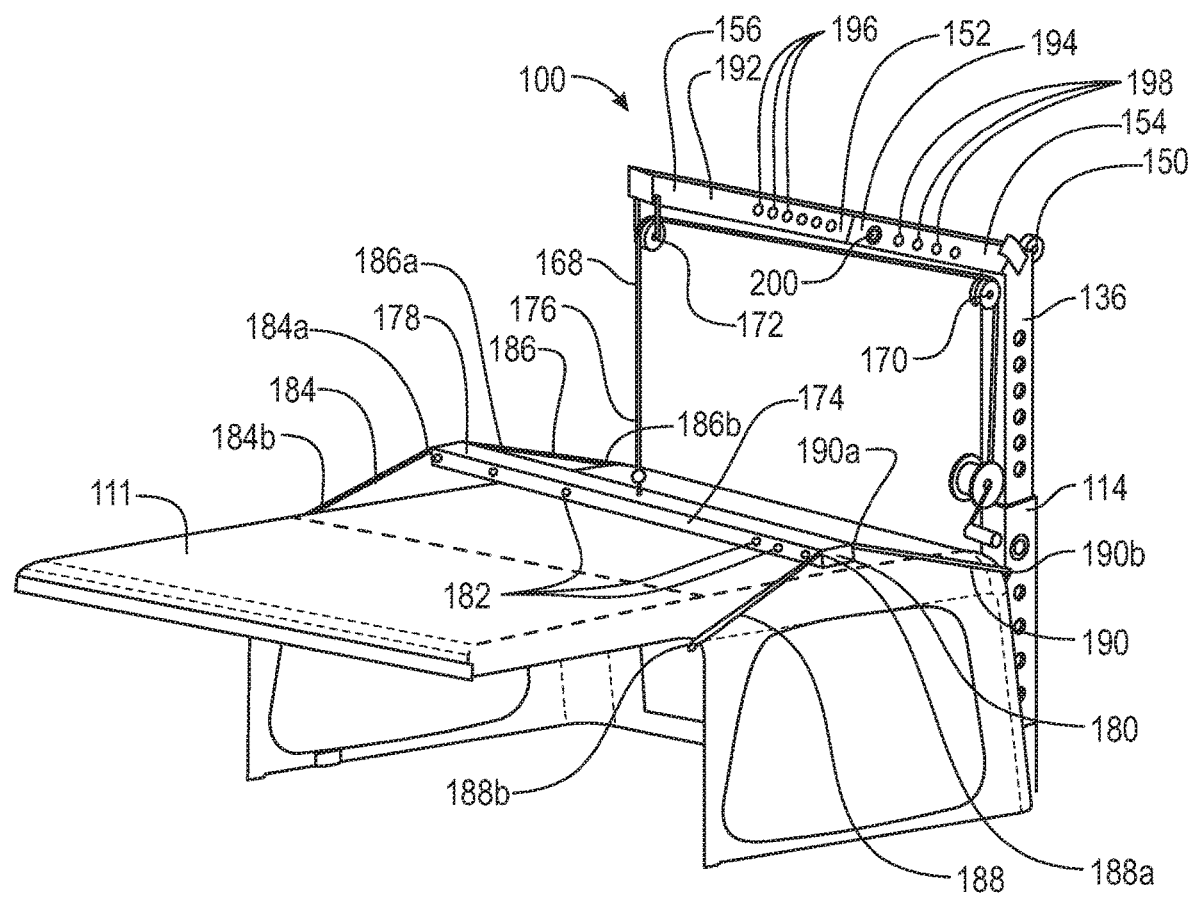
FIG. 3 is a partial front right perspective view of a portable vehicle hardtop removal apparatus removably connected to an illustrative vehicle hardtop, in accordance with embodiments of the invention.

As exemplified in FIGS. 2-3, the portable vehicle hardtop removal apparatus 100 includes an elongated spreader tube 174 connected to a distal end 176 of the hoist line 168. Preferably, the elongated spreader tube 174 is tubular in shape. In another embodiment, the elongated spreader tube 174 is cylindrical in shape. The elongated spreader tube 174 has a first end 178 opposite a second end 180. Preferably, the first end 178 and the second end 180 each define a plurality of linearly aligned spreader apertures 182 each configured to connect to a respective strap, at the option of the user. Straps connect the elongated spreader tube 174 to the removable vehicle hardtop 111, such that the elongated spreader tube 174 is configured to attach to and lift a removable vehicle hardtop 111 off of the vehicle 110, as exemplified in FIGS. 5-6, when said winch 166 is rotated to wind the hoist line 168 thereon.

Figure 4:
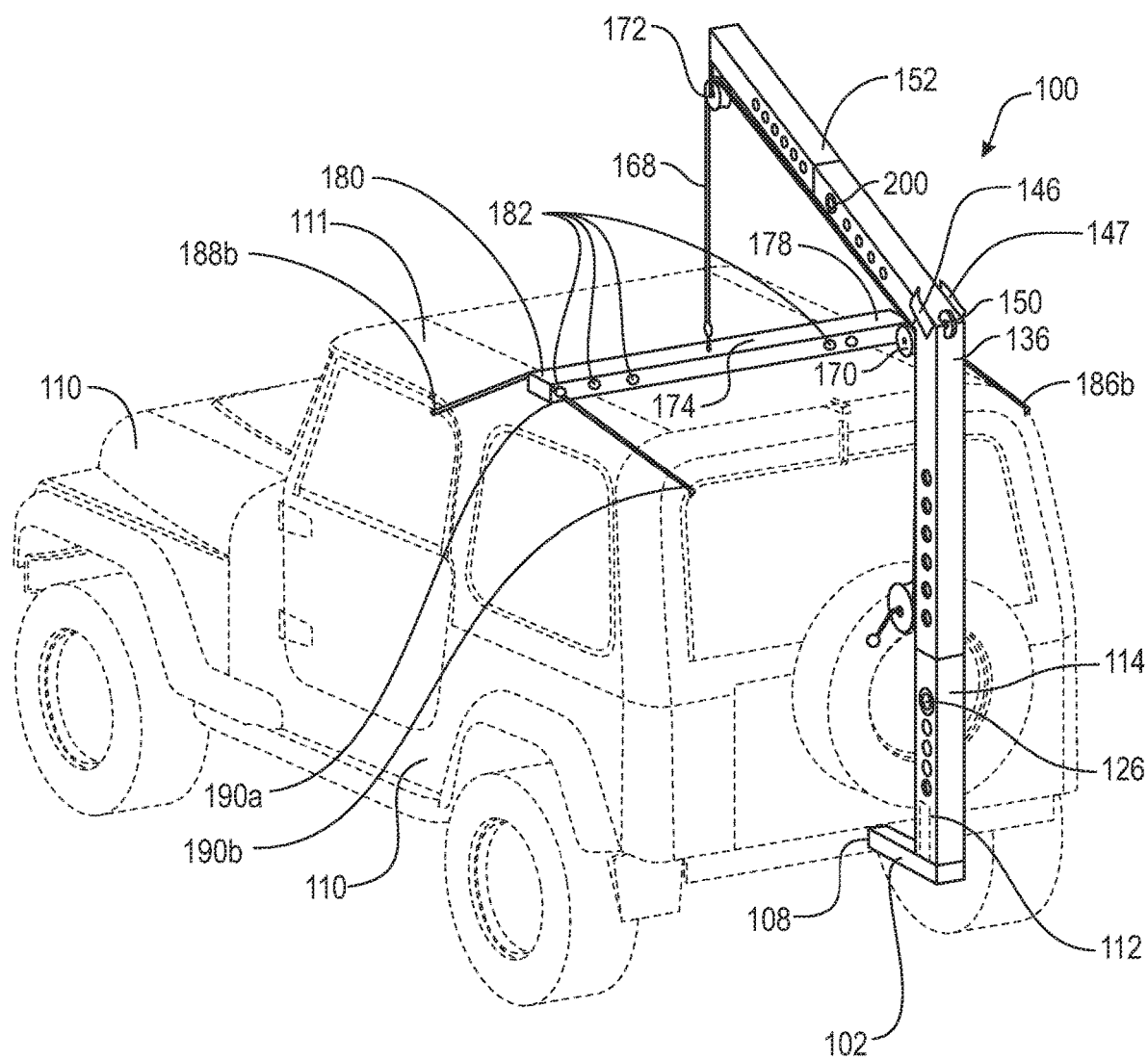
FIG. 4 is a back right perspective view of a portable vehicle hardtop removal apparatus in a lifting position removably connected to an exemplary vehicle hardtop, while removably connected to a receiver hitch of an exemplary vehicle, in accordance with embodiments of the invention.

Referring to FIGS. 3-4, in a preferred embodiment, the portable vehicle hardtop removal apparatus 100 includes a first strap 184, a second strap 186, a third strap 188 and a fourth strap 190. The first strap 184 and the second strap 186 each has a respective connection end 184a, 186a operatively connected to one respective spreader aperture 182 of the plurality of linearly aligned spreader apertures 182 of the first end 178 of the elongated spreader tube 174. The third strap 188 and the fourth strap 190 each has a respective connection end 188a, 190a operatively connected to one respective spreader aperture 182 of the plurality of linearly aligned spreader apertures 182 of the second end 180 of the elongated spreader tube 174.

Preferably, the second strap 186 and the fourth strap 190 each have a respective flat hook end 186b, 190b, adapted to penetrate a gap between a rear window and a structural frame of the removable vehicle hardtop 111, as illustrated in FIG. 4.

Referring to FIGS. 3-5, in a preferred embodiment, the distal end 156 of the lifting boom of the portable vehicle hardtop removal apparatus 100 is telescopically received inside the proximal end 154 of the lifting boom, allowing adjustment of an extension length of the lifting boom 152.

The distal end 156 and the proximal end 154 of the lifting boom 152 each have respective sidewalls 192, 194 which preferably define a plurality of linearly aligned boom apertures 196, 198 adapted for receipt of a boom locking pin 200, for adjustment of the height of the distal end 156 relative to the proximal end 154, configured for adjustment of an extension length of the lifting boom, at an option of a user. In such manner, an owner 130 can set the extension length of the lifting boom 152, along axis 164, at the option and needs of the owner.

As illustrated in FIG. 5, in a preferred embodiment, the portable vehicle hardtop removal apparatus 100 includes a support locking pin 126 and a boom locking pin 200; the support locking pin 126 is removably disposed within one support adjustment aperture 124 of the plurality of linearly aligned support adjustment apertures 124 of the upper portion of the upstanding support member 114 as well as disposed within one support adjustment aperture 125 of the plurality of linearly aligned support adjustment apertures 125 of the bottom portion of the upstanding support member 114; and the boom locking pin 200 is removably disposed in one boom aperture 196, 198 of the plurality of linearly aligned boom apertures 196, 198.

In one embodiment, the portable vehicle hardtop removal apparatus 100 includes an electric winch 166a, and the electric winch 166a has a power cord 167 adapted to removably connect to a 12 volt outlet of the vehicle 110, as exemplified in FIG. 5. As such, the owner 130 can operate the electric winch 166a utilizing power provided by the vehicle.

As can be seen in FIGS. 5-6, through embodiments of the invention disclosed herein, the portable vehicle hardtop removal apparatus 100 can lift and remove a hardtop 111 off of the vehicle 110 while in the lifting position, clearing the frame of the vehicle 110. Since the upstanding support member 114 can swivel on the upstanding swivel member 112, that rotates the lift boom 152, clockwise or counter-clockwise, at the option of the user, which swings the hardtop 111 away from the vehicle 110, at which point the winch 166 can be unwound to safely and conveniently place the hardtop 111 onto the ground. Thus, embodiments of the disclosed invention provide for portable and efficient removals and replacements of hardtops, as the portable vehicle hardtop removal apparatus 100 is lightweight and portable and exhibits superlative properties, without being dependent on heavy, immobile, expensive or complex components.

Moreover, as illustrated in FIG. 7, while in the folded transport position, the portable vehicle hardtop removal apparatus 100 can be driven to the intended destination and future destinations of the owner 130, thereby obviating the need to have separate, complex lifting devices at each destination. Accordingly, as can be appreciated from the descriptions and illustrations herein, embodiments of the disclosed invention provide improved vehicle hardtop removal and replacement features in order to efficiently remove and replace hardtops of many types of vehicles at any destination, in a safe and convenient manner, for people's enjoyment.

Except as may be expressly otherwise indicated, the article "a" or "an" if and as used herein is not intended to limit, and should not be construed as limiting, the description or a claim to a single element to which the article refers. Rather, the article "a" or "an" if and as used herein is intended to cover one or more such elements, unless the text expressly indicates otherwise.

This invention is susceptible to considerable variation within the spirit and scope of the appended claims.

All U.S. patents and publications identified herein are incorporated in their entirety by reference thereto.

The claimed invention is:

1. A portable vehicle hardtop removal apparatus comprising:
    a horizontal support arm having a first end opposite a second end, the first end adapted to extend into a vehicle receiver hitch mounted on a vehicle, the second end protruding from such vehicle receiver hitch, the second end comprising an upstanding swivel member;
    an upstanding support member having an upper portion opposite a bottom portion, the upper portion telescopically received in the bottom portion, the upper portion and bottom portion each having respective sidewalls which define a plurality of linearly aligned apertures adapted for receipt of a support locking pin adapted for adjustment of a height of the upstanding support member at an option of a user, the bottom portion having a bottommost end defining a cylindrical hollow cavity within which the upstanding swivel member is operatively seated, the upper portion having an upper end having a load bearing end surface formed on a load bearing angle that departs from a horizontal plane that is perpendicular to a longitudinal axis of the upstanding support member, the upper end comprising a pair of guide tabs fixed to the respective sidewalls of the upper end, the pair of guide tabs oriented perpendicular to the load bearing end surface, the upper end having a pivot pin connection;
    a lift boom having a proximal end opposite a distal end, the proximal end having a load bearing end surface formed on a load bearing angle that departs from a horizontal plane that is perpendicular to a longitudinal axis of the lift boom, the proximal end pivotally coupled to and extending away from the pivot pin connection of the upper end of the upstanding support member, the lift boom pivotable from a lifting position to a folded transport position,
    wherein in the lifting position the proximal end of the lift boom fits between the pair of guide tabs adapted to resist a lateral movement of the lift boom, the load bearing end surface of the lift boom bears on the load bearing end surface of the upstanding support member, and the lift boom extends upward at an angle that departs from a vertical plane that is parallel to a longitudinal axis of the upstanding support member,
    wherein in the folded transport position the lift boom hangs from the pivot pin connection and is oriented in parallel to the upstanding support member;
    a winch removably attached to the upstanding support member, said winch comprising a hoist line extending vertically from said winch through a first pulley operatively connected to the upper portion of the upstanding support member, said hoist line extending from the first pulley through a second pulley, wherein the second pulley is operatively connected to the distal end of the lift boom, said hoist line connected to an elongated spreader tube at a distal end of the hoist line, said elongated spreader tube having a first end opposite a second end, the first end and the second end each defining a plurality of linearly aligned spreader apertures each adapted for connection to a respective strap, at the option of the user, the elongated spreader tube adapted to attach to and lift a removable vehicle hardtop off of the vehicle when said winch is rotated to wind said hoist line thereon.

2. The portable vehicle hardtop removal apparatus of claim 1, further comprising a first strap, a second strap, a third strap and a fourth strap, the first strap and second strap each having a respective connection end operatively connected to one respective spreader aperture of the plurality of linearly aligned spreader apertures of the first end of the elongated spreader tube, the first strap and second strap each having a respective hook end adapted to connect to the removable vehicle hardtop, the third strap and fourth strap each having a respective connection end operatively connected to one respective spreader aperture of the plurality of linearly aligned spreader apertures of the second end of the elongated spreader tube, the third strap and fourth strap each having a respective hook end adapted to connect to the removable vehicle hardtop.

3. The portable vehicle hardtop removal apparatus of claim 2, the respective hooks of the second strap and the fourth strap each comprise a substantially flat hook portion configured to penetrate a gap between a rear window and support frame structure of the removable vehicle hardtop.

4. The portable vehicle hardtop removal apparatus of claim 1, wherein the distal end of the lift boom is telescopically received in the proximal end of the lift boom, the distal end and the proximal end each having respective sidewalls which define a plurality of linearly aligned boom apertures adapted for receipt of a boom locking pin configured for adjustment of an extension length of the lift boom at an option of a user.

5. The portable vehicle hardtop removal apparatus of claim 1, further comprising a support locking pin and a boom locking pin, wherein the support locking pin is removably disposed in one support adjustment aperture of the plurality of linearly aligned support adjustment apertures, wherein the boom locking pin is removably disposed in one boom aperture of a plurality of linearly aligned boom apertures.

6. The portable vehicle hardtop removal apparatus of claim 1, wherein the winch comprises an electric winch, the electric winch having a power cord adapted to removably connect to a 12 volt outlet of the vehicle.

* * * * *